United States Patent [19]

Medina

[11] Patent Number: 4,578,955
[45] Date of Patent: Apr. 1, 1986

[54] AUTOMOTIVE POWER PLANT

[76] Inventor: Ralph Medina, 15419 Northgate Blvd., Apt. 303, Oak Park, Mich. 48237

[21] Appl. No.: 678,277

[22] Filed: Dec. 5, 1984

[51] Int. Cl.[4] .............................................. F02B 73/00
[52] U.S. Cl. ........................................ 60/709; 60/718; 60/727; 60/729; 180/65.4
[58] Field of Search ................. 60/698, 709, 716, 718, 60/726, 727, 729, 39.45; 180/65.2, 65.4, 165, 301

[56] References Cited

U.S. PATENT DOCUMENTS

| | | | |
|---|---|---|---|
| 3,493,066 | 2/1970 | Dooley | 180/165 |
| 3,970,163 | 7/1976 | Kinoshita | 180/65.2 |
| 4,183,420 | 1/1980 | Kinoshita | 180/65.2 |
| 4,336,856 | 6/1982 | Gamell | 180/165 |
| 4,375,745 | 3/1983 | Schelp | 60/726 X |

Primary Examiner—Stephen F. Husar
Attorney, Agent, or Firm—Cullen, Sloman, Cantor, Grauer, Scott, & Rutherford

[57] ABSTRACT

In an automotive power plant including an electric motor having a drive shaft connected to a transmission and a battery pack connected to the motor for vehicle speeds up to 30 miles per hour approximately, the improvement comprising an alternate power source including an electric generator connectable to the drive shaft having output leads connected to the battery pack and to the motor. An air compressor having a drive shaft is coupled to the motor drive shaft and has a pressurized air outlet connected to a reservoir. A boost pump is connected to the reservoir or air compressor to a combustion chamber having an electric ignition and a connection to a pressurized fuel source and includes a high velocity exhaust gas outlet. A turbine receives exhaust gases for driving an impellor secured upon the compressor shaft.

16 Claims, 2 Drawing Figures

AUTOMOTIVE POWER PLANT

The present invention is particularly directed to an automotive power plant which includes an electric motor with the drive shaft connected to transmission and a battery pack connected to the motor for driving the transmission for low vehicle speeds and wherein there is provided an alternate power source for the motor.

BACKGROUND OF THE INVENTION

Heretofore conventional automotive motor power plants employing electric motors and battery packs for driving a transmission for a limited range of travel of the vehicle are limited by the number and capacity of the storage batteries for traveling distances between 50 to 200 miles, approximately. Heretofore efforts have been made of providing alternate power sources for these power plants wherein a piston type reciprocating internal combustion engine was connectable into the power train with a generator for recharging the batteries and for providing a direct drive to the transmission and wherein various control mechanisms were employed for independent or joint operation of the two power sources.

THE PRIOR ART

Illustrative of prior art efforts to achieve duel or alternative power drives for a vehicle transmission includes the following U.S. patents:

| U.S. Pat. No. | Patent Name |
|---|---|
| 3,379,008 | Manganaro |
| 3,513,929 | Kim |
| 3,704,760 | Maruyama |
| 3,765,180 | Brown |
| 3,847,058 | Manor |
| 3,913,699 | Dyer |
| 3,925,984 | Holleyman |
| 3,986,575 | Eggmann |
| 4,163,367 | Yea |

In the foregoing patents, there are various types of automotive power units which include pneumatic motors driven by pressurized air from a compressed air tank and connected to the wheels of a vehicle together with an electric motor driven by batteries and coupled to the wheels by a transmission and with battery recharging by a turbine operated by air supplied from a compressed air tank.

In some instances there is provided an automotive internal combustion engine which drives a turbine and a compressor supplying air to a storage tank wherein the air is directed to wheel mounted air motors with the turbine operating an electric generator.

In other prior art compressed air is stored in tanks and replenished by battery powered air compressors. In other prior art automotive engines are driven by compressed gas from storage tanks.

Generally in the prior art, various types of combination of hybrid automotive power units have been provided which included batteries, gas turbines, electric motor generators and batteries in order to modify or to augment power transmission for a vehicle.

The primary difficulty with the prior art patents was that they were expensive, complicated in construction, inefficient, impractical, use too much fuel and thus too costly for the normally operated power plant of an automotive vehicle.

SUMMARY OF THE INVENTION

An object of the present invention is to provide an automotive power plant wherein for starting and for low speeds or light loads an electric motor is powered from a battery pack and its drive shaft directly operates a transmission, and wherein for bursts of speeds above 30 mph, for illustration, there is provided an alternate power source connected to the electric motor which replaces the battery drive and wherein the electric motor and its drive shaft operates an electric generator for recharging the batteries and powering the motor and additionally drives an air compressor delivering pressurized air to a boost pump for feeding into a combustion chamber and whereinto a combustable fuel is injected. The hot exhaust high velocity products of combustion are directed to a turbine connected to the compressor shaft for application of torque thereto.

An important feature is to provide for an electric operated vehicle normally driven by batteries, an alternate power source for the electric motor which includes an electric generator connected to the motor drive shaft, with power leads connected to the batteries and to the electric motor and wherein the drive shaft is coupled to an air compressor drive shaft for delivering compressurized air to an air reservoir and wherein pressurized air is directed from the reservoir through a pipe and valve for direction into a combustion chamber.

The combustion chamber has connected thereto means for injecting either liquid or vaporized fuel and wherein the hot combustion gases pass at high velocity through a conduit to a turbine having an impellor secured to the compressor shaft, for transmitting a drive torque thereto and through the coupled motor drive shaft to the vehicle transmission.

An important feature includes a control means connected to the generator and motor for cutting off the battery drive to the motor and for energizing the generator drive to the motor and for energizing the compressor and wherein the turbine transmits torque to the compressor and motor drive shafts.

Another feature is a coupling between the motor shaft and the compressor shaft which includes a normally open clutch and wherein a control means is provided with electrical connections between a relay switch and the clutch.

Another feature includes a boost pump having a first cylinder and first piston therein together with an air pressurizing means for the boost pump which includes a pulser cylinder aligned with the first cylinder and including a reciprocal spring biased second piston within the pulser cylinder having a piston rod connected to the first piston together with a conduit which interconnects the pressurized air reservoir and the pulser cylinder and in conjunction with an intermittently operable cut-off valve for reciprocating the pulser piston for simultaneous reciprocation of the boost pump piston for delivering high pressure air from the compressor to the combustion chamber.

An important feature includes in conjunction with the air compressor which receives atmospheric air and delivers pressurized air to a reservoir tank and thence to the boost pump and wherein pressurized air is intermittently directed to the pulser connected to the boost pump for feeding high pressure air to a combustion chamber.

Another feature includes a fuel source either liquid or vaporized together with feeding means in the nature of a fuel pump or an injector for delivering pressurized fuel into the combustion chamber and in conjunction with a suitable ignition mechanism.

As another feature, for acceleration and for speeds above 25 to 35 mph, approximately, automatic control means are employed which activate the compressor and turbine, with high pressure air is applied to the pulser system for the boost pump for delivery to a combustion chamber to which pressurized fuel is directed. The heated high velocity gases from the combustion chamber are fed to a turbine and expanded to produce torque through the impeller therein upon the compressor shaft and for transmission to the electric motor drive shaft, the generator and to the vehicle transmission.

A further feature provides an electric generator for recharging the batteries through an automatic control system.

A further feature includes an automatic power plant for a better driving range than conventional electric cars and at least equal to the range of present internal combustion powered vehicles.

The present power supply contemplates cold starts utilizing the electric motor driven by the batteries and prevents severe battery discharge and damage normally experienced in conventional electric vehicles and thus provides excellent fuel economy since the turbine automatically cuts in at relatively higher speeds above 30 to 35 mph.

These and other objects and features will be seen from the following Specification and claims in conjunction with the appended drawings.

THE DRAWINGS

It would be understood that the above drawings are merely schematic diagrams illustrative of embodiments of the invention and that other embodiments are contemplated within the scope of the claims hereafter set forth.

DETAILED DESCRIPTION OF AN EMBODIMENT OF THE INVENTION

Figure 1:
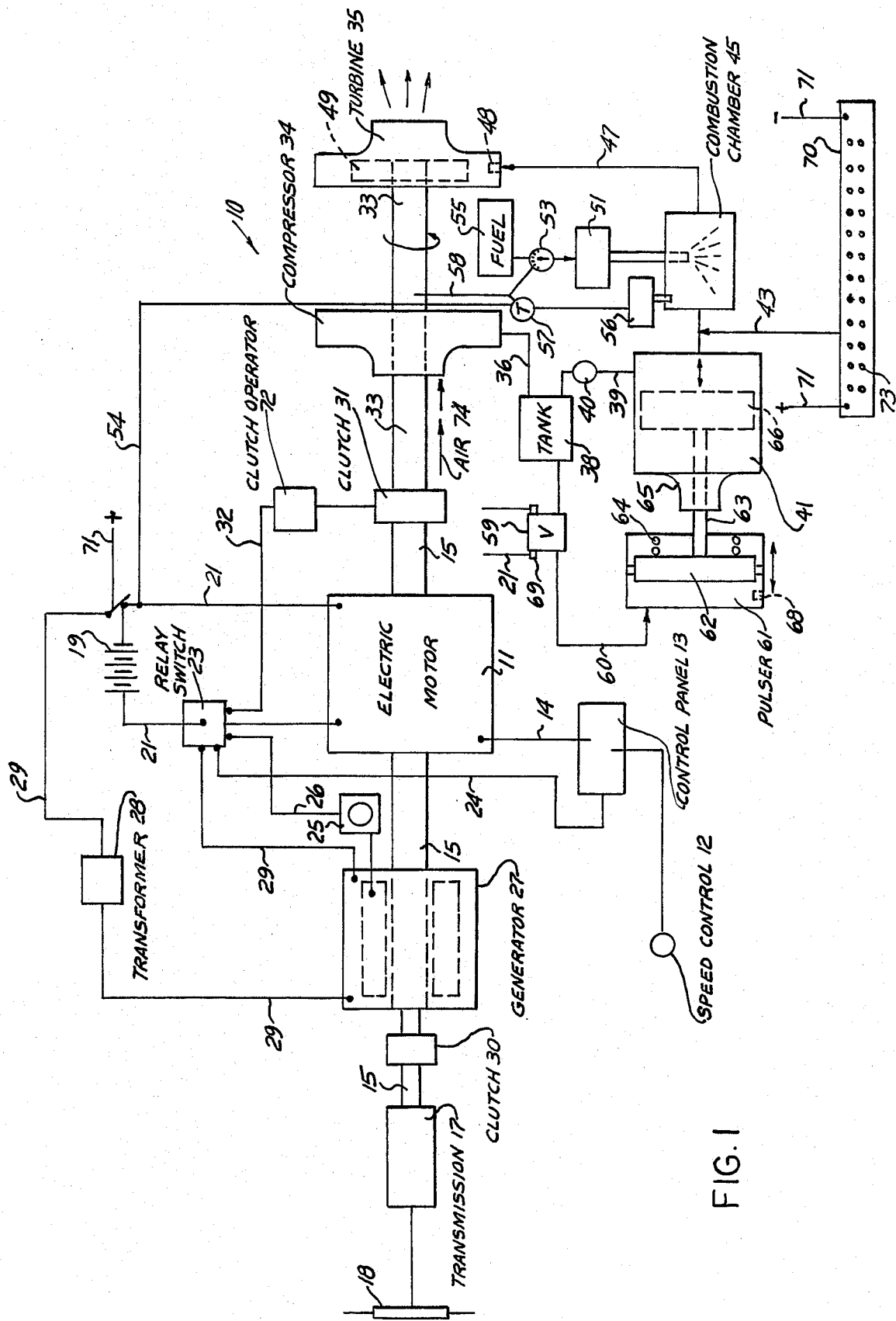
FIG. 1 is a schematic diagram of the mechanical and electrical connections of the present automative power plant with alternate power source for the electric motor.

Referring to the drawings, FIG. 1, there is shown schematically at 10 an automotive power plant for a vehicle which includes an electric motor 11 and connected thereto speed control 12 upon the remote control panel 13 connected by lead 14 to said motor and by a secondary lead 24 to control relay 23.

Motor drive shaft 15 extends to power transmission 17 with an intermediate automatic clutch 30 interposed. The power transmission has an output connected to a vehicle differential 18, schematically shown, for driving one or a pair of more of the vehicle wheels, not shown.

Battery pack 19 consists of a plurality of electric storage batteries of which there may be 12, 14 or 18 or any sufficient number having voltages in the range of 144, 168 and 216 volts, for illustration. The battery pack is connected to electric motor 11 by power leads 21.

Electric control relay 23 is interposed in one of the power leads 21 and is connected to control panel 13 by lead 24. Generator control switch 25 is connected by lead 26 to the electric relay switch 23 and is further connected to the stator or electric field of generator 27, schematically shown. Said generator is adapted to deliver power in the range of 400 to 500 amps, for illustration. The generator stator or field is connected by lead 29 to the battery pack with a suitable transformer 28 interposed. Lead 29 interconnects said generator stator and relay switch 23, FIG. 1.

Motor shaft 15 projects from one end of said motor opposite from electric generator 27 and may be coupled by clutch 31 to compressor drive shaft 33. Clutch 31 is normally open for the low speed mode of the present power plant wherein the electric motor is under the direct control of the battery pack 19. Clutch operator 72 is connected to clutch 31 and by lead 32 to relay switch 23.

Compressor 34, schematically shown, is driven by compressor shaft 33 and has an air inlet 74 for receiving atmospheric air. Gas turbine 35 having a casing receives one end of compressor shaft 33 and mounts an impellor 49 for applying rotative drive torque to compressor shaft 33 when connected thereto and has an exhaust outlet.

Outlet conduit 36 from compressor 34 is connected to air reservoir or tank 38. Pressurized air is stored at a pressure in the range of 300 to 350 pounds square inch pressure, approximately. Pressurized air from reservoir 38 is delivered by conduit 39 to boost pump 41, schematically shown.

Constrictor valve 40 is interposed within conduit 39 and is adapted for delivering pressurized air from the compressor into said boost pump at a reduced pressure, such as 80-90 pounds per square inch, for illustration.

The boost pump 41 has an air outlet feed pipe 43 which is connected to combustion chamber 45. The combustion chamber has a gas pipe or high velocity exhaust outlet pipe 47 delivering high velocity super heated exhaust gases under pressure to the nozzles 48 within gas turbine 35. Expanded gasses impinge upon the impellor 49 within the turbine casing keyed to shaft 33.

Connected to the combustion chamber 45 are one or a plurality of fuel injectors 51 suitably powered at 58 from compressor shaft 33 and connected by a fuel pump 53 or other control to fuel tank 55. Said tank stores liquid or vaporized or gaseous fuel for delivery through fuel pump 53 or other control mechanism to one or a plurality of injectors 51 for delivery into combustion chamber 45. This provides pressurized fuel into combustion chamber 45. Pump 53 has a drive connection 58 to shaft 33.

A suitable electric ignition means is provided for the combustion chamber and is generally indicated at 56. In the illustrative embodiment, there is provided one or a plurality of spark plugs 56 or equivalent electronic ignitor which is mounted on and projected into the combustion chamber 45. Spark plug 56 is connected to the battery pack as by the lead 54, FIG. 1, and also connected to a suitable timer 57 connected to compressor shaft 33 at 58 for providing intermittent ignition within said combustion chamber.

Conduit 60 extends from reservoir tank 38 and is connected to a pulser 61 with intermittently operable cut-off valve 59 interposed. Said cut-off valve is solenoid operated at 69.

In operation, the pressurized air from compressor 34 and conduit 36 is directed to air reservoir 38 and through restrictor valve 40 and conduit 39 directly into one end of boost pump 41 at a pressure of 80–90 pounds.

The present turbo charger includes air pressurizing means which includes a pulser cylinder 61 vented at 68. Pressurized air conduit 60 under the control of the intermittently operable cut-off valve 59 delivers pressurized air to one end of pulser cylinder 61, sometimes referred to as a second cylinder, and wherein the boost pump 41 is in a form of a first cylinder having a reciprocal first piston 66 sealed therein.

Movably sealed within pulser cylinder 61 is a reciprocal second piston 62, or an equivalent diaphram, which is normally spring biased to be in a retracted position, as by the coil springs 64. Piston 62 is adapted to intermittently advance under pressurized air delivered from reservoir 38 through the cut-off valve 59 to cylinder 61.

Said pulser includes reciprocal second piston 62, and axial piston rod 63 which is slidably supported through a suitable bearing at 65 and into one end of turbo charger cylinder 41. A first reciprocal piston 66 is sealed within boost pump cylinder 41 and is connected to piston rod 63 for corresponding reciprocal movements with pulser piston 62.

Such reciprocal movements of the pulser piston 62 effects simultaneous corresponding reciprocal movements of the boost pump piston 66 for increasing the pressure of the air delivered therefrom through air outlet 43 to combustion chamber 45. It is considered equivalent to the respective pistons 62 and 66 and there be employed suitable diaphragms peripherally mounted and sealed within the corresponding cylinders.

For illustration, a pair of solenoids 69 are mounted upon the intermittently operable cut-off valve 59, and are connected to the electrical power circuit including the lead 21 for battery pack 19.

In the illustrative embodiment, there is interposed in the conduit 43 between boost pump 41 and combustion chamber 45, an air heater having a casing 70 schematically shown. A plurality of electric resistance heater coils 73 are interposed within the heater and suitably connected to the power circuit by the leads 71, fragmentarily shown. This provides a means by which the pressurized air from the boost pump 41 may be preheated before passage into combustion chamber 45, thereby improving combustion efficiency.

MODIFICATION

Figure 2:
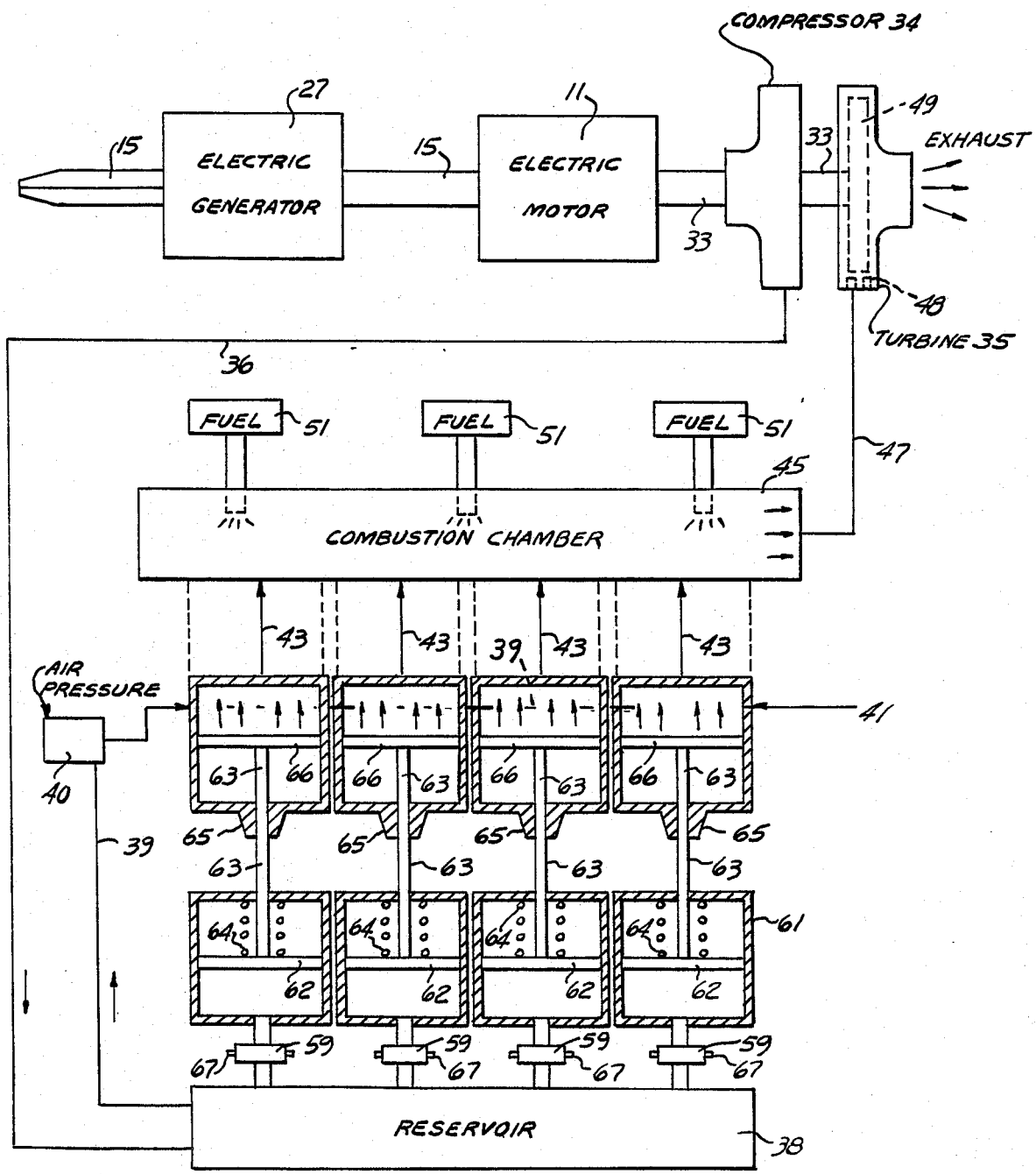
FIG. 2 is a similar schematic view showing a modified boost pump and pulser.

FIG. 2 is a schematic illustration of a modified power plant wherein the corresponding parts are similarly numbered. The primary difference in this modification is that there are shown a plurality of fuel injectors 51 corresponding to FIG. 1 for delivering pressurized fuel into combustion chamber 45.

Instead of the single boost pump 41, in FIG. 1, there are provided a plurality of first cylinders 41, FIG. 2, respectively connected to the reservoir 38 through the conduits 39 or restrictor valves 40. The respective boost pumps include the laterally spaced first cylinders 41 including therein reciprocal first pistons 66.

There is provided a pulser cylinder 61 to correspond to each of and aligned with the corresponding first cylinders 41. Each of the pulser cylinders 61 includes a second reciprocal piston 62 sealed therein and biased for movement in one direction by the respective coil springs 64. Said pistons are adapted for intermittent reciprocal movements. Reservoir 38 includes a series of pressure outlets to which are connected corresponding respective intermittently operable cut-off valves 59, solenoid operated as at 67, for intermittently delivering pressurized air into the respective second cylinders 61 forming a part of the respective pulsers.

Intermittent reciprocal movements of the second pistons 62 through their respective piston rods 63 effect corresponding reciprocal movements of the first pistons 66 within boost pump cylinders 41, FIG. 2. The respective boost pump cylinders 41 are individually connected to combustion chamber 45 by a plurality of conduits 43 as schematically shown.

OPERATION

The operating sequence for the present automotive power plant is as follows:

1. For starting and for light loads and low speeds under the control of panel 13, speed control 12, and the electric relay switch 23, the electric motor 11 is connected to control panel 13 by lead 14 and is further connected to battery pack 19 through the leads 21. This provides rotation of drive shaft 15 connected by clutch 30 to transmission 17. This mode of operation continues through low speeds up to 30 to 35 miles per hour, approximately, for the vehicle. The present automatic control is initially set to prevent power transfer to the electric generator 27, compressor 34 and turbine 35.

For acceleration and for speeds above 30 to 35 mph, for illustration, the automatic controls, including operation of the remote control panel 13 and the relay switch 23, generator control switch 25 energize said generator and for connecting drive shaft 15 to the rotor. Said rotor in turn energizes the field of the stator which through leads 29 delivers electrical power to battery pack 19 for recharging the batteries and for additionally providing power through leads 21 to electric motor 11.

Electric relay switch 23 through lead 32 engages the operator 72 for the normally open clutch 31 transmitting rotative torque from drive shaft 15 to compressor drive shaft 33 to operate compressor 34.

The compressor 34 provides a build-up of pressurized air through the conduit 36 directly to air reservoir 38. The air reservoir 38 normally will be directly connected by a suitable conduit 39 to one end of boost pump cylinder 41. This provides a means of providing pressurized air through pipe 43 to combustion chamber 45. The pressurized air may pass through the air heater 70 in conduit 43 for delivering pressurized and preheated air into said combustion chamber.

The ignition assembly includes one or a plurality of spark plugs 56 or other ignitors under the control of compressor shaft 33 and timer 57 to provide ignition for the combustible mixture which includes pressurized fuel injected at 51 into the combustion chamber. The super heated exhaust gases of combustion are delivered at high velocity through conduit 47 and through the nozzles 48 within the casing of turbine 35. These expand and impinge upon impellor 49 for supplying drive torque to compressor shaft 33 and in turn to drive shaft 15 for augmenting power to transmission 17.

The present automotive power plant uses in the alternative at least a pair of different energy sources during normal operation of a vehicle driven by the present power plant.

The battery, compressor, gas turbine, air generator and electric motor system is further adapted to power a vehicle and can utilize fuel from the fuel tank available to the public at a lower price than conventional gasoline.

Gas fuel may be used at higher speeds such as exceeding 30 mph, for illustration, and is adapted to prolong the life of the vehicle batteries as the power source shifts from the batteries to the gas turbine, generator drive.

The generator takes command to supply energy to the electric motor so that at that point the batteries are recharged until needed again at lower speeds.

The velocity of air delivered to the air compressor is improved by the air rush on forward movement of the vehicle with air entering the compressor at 74, FIG. 1. The pressurized air is fed throughout line 39 to turbo charger 41. The conduit 36 directs pressurized air to air pressure tank 38 or reservoir. Thus, for acceleration and even at slow speeds, as desired, the power plant is capable of operation without drawing upon the batteries under the remote panel control at 13, electric relay switch 23 and generator control 25.

The generator produces electrical power to the electric motor to increase the speed of the vehicle for more efficiency. The present electric relay switch 23 is used to control or to switch the electrical power from the battery pack 19 to the generator source or vice versa. The battery energy source can be automatically switched off in a conventional manner once the turbine, generator group is working.

Gas or other fuel consumption will take place only after the vehicle has accelerated to 30 or 35 mph, for illustration, therefore reducing the usage of both fuel and batteries.

Once the vehicle is in motion under the control of the batteries less stress is demanded from the gas turbine. It is believed that the present power plant will effect 25 to 30 percent gas or power savings because the major effort in starting the vehicle is through battery pack 19.

In the illustrative embodiment the electric motor has a rating of 35 to 40 horsepower, for illustration, and is sufficient for limited size vehicles. The generator ranges between 400 and 500 amps. There is provided an automatic clutch 30 between the electric motor drive shaft 15 and transmission 17 for smooth performance.

Such elements in the combination defined include the transmission 17 the automatic clutch 30 as well as the normally open clutch 31. These are conventional elements which may be purchased on the market and a detailed description thereof is omitted.

The compressor under the drive of motor shaft 15 and compressor shaft 33 is effective for feeding pressurized air to the boost pump and thence to the combustion chamber for delivering high velocity hot exhaust gases to nozzles 48 within the casing of turbine 35.

Further compression of combustion air for delivery to combustion chamber 45 is achieved by the use of the present pulser assembly 61. Here the reciprocation of the spring biased piston 62 effects corresponding reciprocal movements of the boost pump piston 66 increasing the extent of pressure of the air delivered to combustion chamber 45.

The air heater chamber 70, which in the illustrative embodiment is electrically operated by coils 73 connected to the power source, provides a further means of reducing fuel consumption since the heated air expands further and improves the efficiency of the combustion chamber and operation of turbine 35. Suitable speed control 12 is provided upon or connected to control panel 13 for regulating the operation of the present automative power plant.

Having described my invention, reference should now be had to the following claims.

I claim:

1. In an automotive power plant including an electric motor having a drive shaft, an automatic transmission connected to said drive shaft and a battery pack with power leads connected to said motor for operating said transmission for vehicle speeds up to 30 miles per hour, approximately;

the improvement comprising an alternate power source for said motor including an electric generator having a rotor receiving and connectable to said drive shaft and a stator having output leads connected to said battery pack;

an air compressor having an air inlet, a drive shaft axially coupled to said motor drive shaft and a pressure air outlet;

a pressurized air reservoir connected to said air outlet;

a boost pump having an air inlet connected to said reservoir, air pressurizing means and a pressurized air outlet;

a combustion chamber having a first inlet connected to said boost pump outlet and a combustion exhaust pipe;

a pressurized fuel source connected to said combustion chamber;

an ignition means in said combustion chamber connected to said battery pack;

a turbine having a casing and an impellor therein axially mounted upon and connected to said compressor drive shaft and with said casing connected to said combustion exhaust pipe;

and control means connected to said generator for cutting off battery drive to said motor and energizing said generator and said compressor, said turbine transmitting torque to said compressor and motor drive shafts.

2. In the power plant of claim 1, said control means including an electrical circuit having a control switch connected to said generator for energizing said stator, a relay switch connected to said power leads and to said control switch and a remote panel control connected to said relay switch and motor.

3. In the power plant of claim 2, the coupling between said motor drive shaft and compressor drive shaft including a normally open clutch;

said control means further including an electrical connector between said relay switch and said clutch.

4. In the power plant of claim 1, said boost pump including a first cylinder and a reciprocal first piston therein;

said air pressurizing means including a pulser cylinder aligned with said first cylinder;

a reciprocal spring biased second piston in said pulser cylinder having a piston rod connected to said first piston;

a conduit interconnecting said air reservoir and said pulser cylinder;

and an intermittently operable cut-off valve in said latter conduit for reciprocating said second piston.

5. In the automotive power plant of claim 4, the spring bias of said second piston including a coiled spring interposed between said second piston and pulser cylinder intermittently retracting said second piston;

said cut-off valve controlling flow of pressurized air to said pulser cylinder for intermittently advancing its piston.

6. In the automotive power plant of claim 5, a solenoid on said cut-off valve connected to said power leads for intermittently operating said cut-off valve.

7. In the automotive power plant of claim 1, said fuel source including a tank containing fuel, and a fuel pressurizing means interconnecting said tank and said combustion chamber for injecting pressurized fuel thereinto.

8. In the automotive power plant of claim 7, said fuel pressurizing means being a fuel pump connected to said compressor shaft.

9. In the automotive power plant of claim 7, said fuel pressurizing means including an injector connected to said compressor shaft.

10. In the automotive power plant of claim 1, said ignition means including at least one spark plug, and a timing means connected to said spark plug and to said compressor shaft.

11. In the automotive power plant of claim 1, and an air preheater interposed into the connection of said boost pump outlet to said combustion chamber.

12. In the automotive power plant of claim 1, and nozzels within said turbine casing connected to said combustion exhaust pipe for directing expanding pressurized gases to said impellor.

13. In the power plant of claim 3, a clutch operator interposed between said electrical connector and clutch for engaging said clutch on activation of said panel control.

14. In the power plant of claim 1, a restictor valve connected to said reservor and to said boost pump.

15. In the automotive power plant of claim 11, said air reheater including an electric resistance coil within said heater and connected to said battery pack.

16. In the power plant of claim 1, said boost pump including a plurality of first cylinders respectively connected to said reservoir;
   each first cylinder having a reciprocal first piston and each first cylinder outletting into said combustion chamber;
   said air pressurizing means including a corresponding plurality of pulser cylinders aligned with said first cylinders respectively;
   a reciprocal spring biased second piston in each pulser cylinder having a piston rod connected to said first pistons respectively;
   there being a plurality of conduits interconnecting said air reservoir with each of said pulser cylinders;
   and an intermittently operable solenoid control valve in each of said latter conduits for reciprocating said second pistons respectively.

* * * * *